United States Patent
Simon (10) Patent No.: US 8,032,267 B1
(45) Date of Patent: Oct. 4, 2011

(54) AVIATION NAVIGATIONAL AND FLIGHT MANAGEMENT SYSTEMS AND METHODS WITH EMERGENCY LANDING GUIDANCE AND RADAR VECTORING

(75) Inventor: Jeffrey M. Simon, Sudbury, MA (US)

(73) Assignee: Honeywell International Inc., Morristown, NJ (US)

( * ) Notice: Subject to any disclaimer, the term of this patent is extended or adjusted under 35 U.S.C. 154(b) by 1101 days.

(21) Appl. No.: 11/781,258

(22) Filed: Jul. 22, 2007

Related U.S. Application Data (63) Continuation-in-part of application No. 11/695,866, filed on Apr. 3, 2007, now Pat. No. 7,885,733.

(60) Provisional application No. 60/833,439, filed on Jul. 26, 2006, provisional application No. 60/788,638, filed on Apr. 3, 2006.

(51) Int. Cl.
*G05D 1/00* (2006.01)

(52) U.S. Cl. .......................................................... 701/4

(58) Field of Classification Search ............... 701/1, 3–4, 701/16–18; 340/945, 947–948, 951; 342/33–35; 244/144 R
See application file for complete search history.

(56) References Cited

U.S. PATENT DOCUMENTS

| | | |
|---|---|---|
| 2,784,307 A | 3/1957 | Burton |
| 3,605,083 A | 9/1971 | Kramer |
| 3,643,213 A | 2/1972 | Yurasek et al. |
| 3,711,826 A | 1/1973 | La Russa |
| 3,784,969 A | 1/1974 | Wilckens et al. |
| 3,786,505 A | 1/1974 | Rennie |
| 3,789,356 A | 1/1974 | Harenberg, Jr. et al. |
| 3,843,554 A | 10/1974 | Aykan et al. |
| 4,057,782 A | 11/1977 | Muller |
| 4,316,252 A | 2/1982 | Cooper |
| 4,368,517 A | 1/1983 | Lovering |
| 4,419,079 A | 12/1983 | Georges et al. |

(Continued)

FOREIGN PATENT DOCUMENTS

EP 0 399 670 A2 11/1990

OTHER PUBLICATIONS

1st Class Moving Map, Digital Sky, (No Date).

(Continued)

*Primary Examiner* — Yonel Beaulieu
(74) *Attorney, Agent, or Firm* — Ingrassia Fisher & Lorenz, P.C.

(57) ABSTRACT

The invention provides, in one aspect, aviation navigational and/or flight management systems and methods that accommodate emergencies requiring provide real-time, built-in guidance to a nearest reachable airport. Related aspects of the invention provide such systems as respond to an operator alert, e.g., pressing of a button, by provide a graphical representation of the flight path to a nearest reachable airport. Further related aspects of the invention provide such systems as take geography into account in (i) identifying a nearest reachable airport, and (ii) determining a path to that airport. Still further related aspects of the invention provide such system as take characteristics of the host aircraft, weather and other externalities into account (i) identifying a nearest reachable airport, and (ii) determining a path to that airport. Other aspects of the invention provide systems as described above that, additionally, accommodate real-time radar vectoring operations and/or course deviation information from a predetermined flight plan between an origin location and a desired final destination.

20 Claims, 4 Drawing Sheets

U.S. PATENT DOCUMENTS

| | | | |
|---|---|---|---|
| 4,419,731 | A | 12/1983 | Puffett et al. |
| 4,493,114 | A * | 1/1985 | Geller et al. .................. 398/119 |
| 4,660,157 | A | 4/1987 | Beckwith et al. |
| 4,825,374 | A | 4/1989 | King et al. |
| 4,999,780 | A | 3/1991 | Mitchell |
| 5,047,942 | A | 9/1991 | Middleton et al. |
| 5,101,357 | A | 3/1992 | Tempelhof et al. |
| 5,115,398 | A | 5/1992 | De Jong et al. |
| 5,343,395 | A | 8/1994 | Watts |
| 5,355,442 | A | 10/1994 | Paglieroni |
| 5,566,073 | A | 10/1996 | Margolin |
| 5,638,282 | A | 6/1997 | Chazelle et al. |
| 5,904,724 | A | 5/1999 | Margolin |
| 6,804,585 | B2 | 10/2004 | Humbard et al. |
| 6,985,091 | B2 | 1/2006 | Price |
| 7,120,540 | B2 | 10/2006 | Meunier |
| 2002/0069019 | A1 | 6/2002 | Lin |
| 2007/0055434 | A1 * | 3/2007 | Kohlmann .................... 701/100 |
| 2007/0171094 | A1 | 7/2007 | Alter et al. |

OTHER PUBLICATIONS

3 SpaceFastrak, Polhemus, Jan. 1994.
Buening, Tactical Mapping in Combat Aircraft, IEEE, 5 pages, 1998.
Gallant, "System revolutionizes surveying and navigation", EDN, pp. 31-42, Jan. 7, 1993.
GPS 100 AVD Personal Navigator, Garmin International, Inc., 1991.
Hard Drivin, Atari Games Corp., 1988.
Jacobs et al., "Fractal Image Compression Using Iterated Transforms: Applications to DTED", NCCOSC RDT&E Div., pp. 1122-1128, Oct. 11, 1992.
Jeppensen Master Dabase, NavaData (undated).
KNS80 Integrated NAV System, Bendix/King, Apr. 1989.
Lyons, et al., "Some Navigational Concepts for Remotely Piloted Vehicles", Agard Conference Proceedings, Aug. 1976 (15 pgs.).
Magellan GPS Map 7000, Jan. 1999.
Pasman, W. et al., "Implementation of an Augmented Reality System on a PDA," Proc. ISMAR 2003, Tokyo, Japan, (Nov. 4-7, 2003).
Patrick, et al., "ITARS Robust Demonstration System Integration", IEEE, pp. 83-87, 1988.
Raymer, et al., "Advanced Terrain Data Processor", IEEE, pp. 636-639, 1994.
"Steel Talons", Atari Games Corp., 1991.
Trimble Navigation TNL 1000 GPS Navigator 1992 Pilot Guide, 2 pages.
Uijt De Haag, M. et al., "Terrain Database Integrity Monitoring for Synthetic Vision Systems," IEEE Trans. Aerospace & Electronic Sys. 41:386-406 (Apr. 2005).
U.S. GeoData Digital Line Graphs, U.S. Dept. of the Interior, 12 pages, Jun. 1993.
US GeoData Digital Elevation Models, U.S. Dept. of the Interior, 6 pages, Jun. 1993.
Vadlamani. A. et al., "Improved Downward-Looking Terrain Database Integrity Monitor and Terrain Navigation," Proc. IEEE Aerospace Conf. pp. 1594-1607 (Mar. 2004).
Vadlamani. A. et al., "A 3-D Spatial Integrity Monitor for Terrain Databases," Proc. 23d IEEE/AIAA Digital Avionics Systems Conf. (DASC) p. 4.C.2-1-4.C.2-13 (Oct. 2004).

* cited by examiner

AVIATION NAVIGATIONAL AND FLIGHT MANAGEMENT SYSTEMS AND METHODS WITH EMERGENCY LANDING GUIDANCE AND RADAR VECTORING

This application claims the benefit of filing of U.S. Provisional Patent Application No. 60/833,439, filed Jul. 26, 2006, for "Aviation Navigational and Flight Management Systems and Methods With Emergency Landing Guidance and Radar Vectoring." This application is also a continuation-in-part of U.S. patent application Ser. No. 11/695,866, filed Apr. 3, 2007 (now U.S. Pat. No. 7,885,733), which claims the benefit U.S. Provisional Patent Application Ser. No. 60/788,638, filed Apr. 3, 2006, for "Aviation Navigational and Flight Management Systems and Methods Utilizing Radar Vectoring." The teachings of all of the foregoing applications are incorporated herein by reference.

BACKGROUND OF THE INVENTION

The present application pertains to aviation navigational and flight management systems and methods and, more particularly, to improved systems and methods for providing emergency landing guidance and utilizing radar vectors in conjunction with navigational guidance information. Such systems and methods can be used to guide a pilot to suitable airports or other landing sites in cases of forced and/or precautionary landings. They can also be used for real-time correction of navigational guidance based upon real-time off-course operations.

Aviation navigational systems allow a pilot to determine an aircraft's heading, altitude and position, e.g., vis-a-vis navigational beacons, the global positioning system or otherwise. Some such systems also display the host craft position relative to a pre-determined flight route and/or relative to the geography over which it is flying. These displays are typically two-dimensional (2D), though, increasingly the marketplace offers three-dimensional (3D) displays. One such system is the VistaNav™ flight navigation system, commercially available from the assignee hereof, that displays real-time, synthetic three-dimensional images of the airspace and terrain in the vicinity of an aircraft in-flight, as well as during take-off and landing.

Such aviation navigational systems allow an operator to prepare a desired flight plan between two locations. The flight plan data, which can be presented as a two-dimensional moving map or as three-dimensional views, can be visualized on an electronic display, with an associated computer providing the visualization data. As the aircraft travels along the desired flight plan path, its actual location can be indicated on the display relative to the desired flight plan. A course deviation indicator ("CDI") can be used to indicate to an operator how far off course a vehicle is relative to a desired course, allowing the pilot to adjust the actual flight of the vehicle to attempt to match the desired flight plan. As such, current navigation systems can provide pilots with information to maintain a flight path consistent with a predetermined desired flight plan.

Off-course operations are often initiated by Air Traffic Control ("ATC") or other sources to maintain safe air traffic operations due to heavy air traffic or poor weather conditions. Such operations are typically based on specified vectors indicating heading and altitude to be maintained by the aircraft. Such headings can be provided on an absolute, relative, or magnetic basis.

Off-course operations are not accommodated by existing aviation navigation systems. Upon deviating from a desired flight plan due to a directed off-course radar vectoring, the navigation system constantly indicates the "erroneous" flight path of the vehicle, though such deviation is an intended operation. As well, existing navigation systems cannot provide guidance for the actual off-course vectoring operations. Accordingly, off-course vectoring is often performed manually, with vectoring directions written down on paper by aircraft pilots who are busily performing other piloting functions. Furthermore, upon completing off-course vectoring operations, the originally plotted flight path may not provide an efficient flight plan to the intended destination because the aerial vehicle's location is far from the desired path. Though a new flight path to the final destination may be replotted relative to the vehicle's current location, such recalculation can be disruptive to aerial vehicle operators during flight operations. As well, recalculation necessarily results in the loss of all historical data for the current flight, which can result in the loss of valuable flight information. These problems can be further compounded if multiple off-course vectoring operations occur during a particular trip.

During actual flight operations, emergencies can occur. These may be a result of complete loss of power to the engines, e.g., due to mechanical failure, fuel loss, fire and so forth. These may also arise under conditions not amounting to complete loss of engine power, including lesser equipment failures, sick passengers, and so forth. The prescribed response to such emergencies is to land at the nearest possible airport, often by gliding the aircraft under little or no power.

However, the prior art offers little in the way of guidance to achieve this. Thus, for example, U.S. Pat. No. 6,804,585 discloses an aviation navigational system that complements a conventional moving map display with circular symbols that are centered on each airport and that are sized according to the glide performance of the aircraft. Though the patent suggests that the circular symbols can be modified to account for variations in the craft's glide range resulting from head- and tail-wind, the navigational system it proposes does little to aid a pilot in actually reaching any of the circled airports in the event of emergency.

An object of this invention is to provide improved methods and apparatus for aerial navigation.

A further object of the invention is to provide such methods and apparatus as offer emergency landing guidance.

A still further object of the invention is to provide such methods and apparatus as can be used in cases of forced and/or precautionary landings.

A further object is to provide such methods and apparatus as are adapted for accommodating off-course vectoring operations.

A still yet further object of the invention is to provide such methods and apparatus as can be adapted for use with visualization navigation aids.

SUMMARY OF THE INVENTION

The foregoing objects are among those attained by the invention which provides, in one aspect, aviation navigational and/or flight management systems and methods that accommodate emergencies requiring real-time, built-in guidance to a nearest reachable airport (or other landing site).

Related aspects of the invention provide such systems as respond to an operator alert, e.g., pressing of a button or voice command, by providing a graphical representation of the flight path to a nearest reachable airport.

Further related aspects of the invention provide such systems as take characteristics of the host aircraft, weather and other externalities into account in (i) identifying a nearest reachable airport, and (ii) determining a path to that airport.

Such systems can, for example, disregard nearby airports that cannot be reached, e.g., under powerless flight, due to mountains (or other geographic and/or manmade features), airport-specific runway approaches, and so forth. Among nearby airports that can be reached, such systems can, by way of further example, provide flight paths that take those geographic and manmade features, airport-specific runway approaches, and so forth into account—even if those paths are non-linear—thereby insuring that the pilot can appropriately position the disabled craft for landing.

Other aspects of the invention provide systems as described above that, additionally, accommodate real-time radar vectoring operations and/or course deviation information from a predetermined flight plan between an origin location and a desired final destination.

In related aspects, such aviation navigational and/or flight management systems can be configured to provide real-time, built-in guidance during off-course radar vectoring, and can optionally provide such guidance while maintaining actual historical flight data and associated flight plan data for reaching the desired final destination.

In further related aspects, such systems can be configured to recalculate a flight plan that provides real-time guidance to the desired final destination upon completion of radar vectoring operations, without losing historical flight data associated with the current flight. Operationally, radar vectoring can conclude with instruction, e.g., from ATC, to resume navigation and/or join a published approach.

In other related aspects, such aviation navigational systems can be practiced using a display to provide a graphical representation of the flight plan to the desired final destination, and any related radar vectoring flight operations being performed. Graphical representations include, without limitation, two-dimensional map representations (e.g., a moving map) and three-dimensional changing views, which can include an indicator showing the desired flight plan path or radar vectoring (e.g., a guidance line on a two-dimensional map or highway-in-the-sky ("HITS") symbology in a three-dimensional representation). The graphical display can also include an indicator showing the actual location of a vehicle relative to the desired flight plan or radar vectoring. Indicators showing a desired flight course, or an actual flight course, can also be represented by a heading and altitude in text format on the graphical display. Since heading can be specified in absolute, relative, or magnetic terms, an aviation navigational system can be configured to accept the heading in any of these terms, and/or to convert the heading into a desired basis. CDI can also be provided as part of the system to aid adjustment to maintain, or return to, a desired flight path.

Still other aspects provide such systems as can be configured to permit users to obtain flight data and plans as described herein using on-board systems that are portable, and/or built into an aerial vehicle. Such systems can include a display and a processing section which are in communication. The processing section can include connections to one or more data input sources that include a position sensor (e.g., antenna in radio communication with a GPS or LO-RAN), a heading sensor (e.g., a magnetic heading source such as a compass), an altitude sensor, a source of weather data, etc.

Still further aspects provide methods that are in accord with the various operations performed by the systems described herein.

These and other aspects of the invention are evident in the drawings and in the description that follows. Advantages of methods and systems according to the invention include, among others, providing an aviation navigation system that can provide real-time guidance during off-course radar vectoring and/or during emergency landing operations. The methods and systems can also provide such radar vectoring guidance and revert back to providing guidance to a predetermined destination without losing current flight information.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
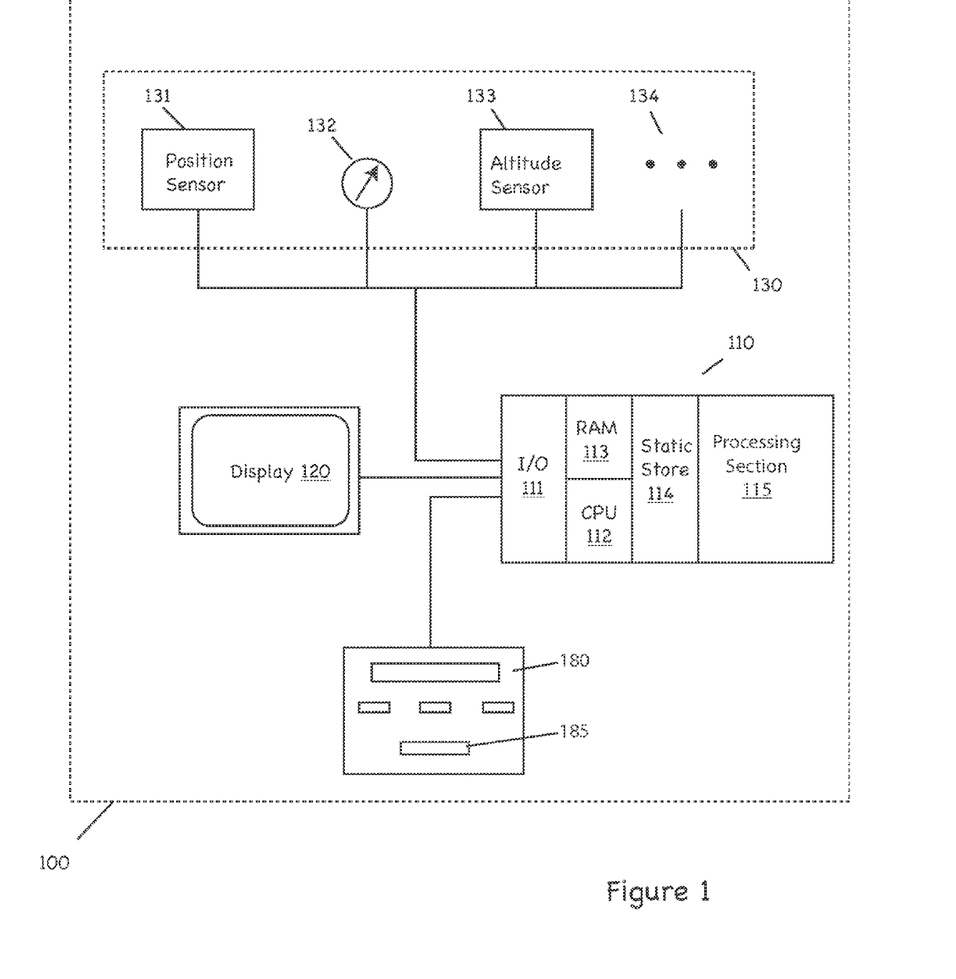
FIG. 1 depicts an exemplary aviation navigation system in accord with embodiments of the invention.

FIG. 1 depicts an exemplary aviation navigational system 100 according to one practice of the invention. The system 100 includes a display 120 that is coupled to a processing unit 110, both constructed and operated in accord with flight navigational systems of the type known in the art (for example, in accord with the VistaNav™ multifunction flight display, sold by the assignee hereof, Mercury Computer Systems Inc., Chelmsford, Mass.)—albeit adapted in accord with the teachings hereof.

The processing unit 110 can be configured with an input/output section 111 to receive data from a number of input devices, such as an array 130 of sensors that operate in the conventional manner known in the art, again as adapted in accord with the teachings of the present application. Types of sensors for gathering information for use by the system 100 can include position sensor systems 131 (e.g., an antenna for communication with a GPS or LORAN); heading sensor systems 132 (e.g., magnetic heading sources such as compasses and gyroscopes); altitude sensor systems 133; and other sensing systems or other data sources 134 (e.g. weather data such as wind and temperature measurements). System 100 can also include (or be coupled to) a static storage device 114 (e.g., CD-ROM, DVD, or other type of long-term storage device) storing information such as geographic mapping information, e.g., in the conventional manner known in the art.

The processing unit 110 can also be coupled to an input device 180, such as a keyboard, touchpad, or the like, permitting the pilot or other operator to provide inputs such as destination data for creating a flight plan. The input device 180 may also include a microphone (or other audio input device) and speech recognition functionality, permitting the pilot to provide such inputs through verbal commands.

In accord with the teachings hereof, that input device 180 can also be utilized to permit radar vectoring, or to provide commands to transition from off-course radar vectoring back to a flight plan to reach the originally intended destination. For example, the input device 180 can include a radar revector button 185 or switch, which can cause the system 100 to recalculate a flight plan to an intended destination after off-course radar vectoring operations have been completed, as described in more detail herein. The input device 180 can also be utilized to activate an emergency landing guidance mode, as described herein.

The processing unit 110 itself can also include other conventional components known in the art (albeit adapted in accord with the teachings hereof) such as a central processing unit 112, random access memory 113, and a procession section 115 that can be configured to carry out the various functionalities of the system 100 (and, more particularly, for example, of the processing unit 110) as described herein.

Though FIG. 1 depicts an exemplary configuration of an aviation navigation system according to the invention, those skilled in the art will appreciate that other configurations can be used to perform the functions described herein. For example, various ones of the devices shown and described separately herein (such as the display 120 and the input unit 180) can be integrated together as a single physical unit; conversely, components of individual ones of the devices (such as processing unit 110 and static store 114) can be embodied as physically distinct units that are coupled to one another for communication in accord herewith. Furthermore, communications coupling between devices can be through a physical connection (e.g., a wired connection), through wireless (e.g., RF) connection or other remote communication system. As well, the display 120, processing unit 110, and input device 180 can be embodied as a stand-alone portable device that can be easily transferred between aerial vehicles, or the system pieces can be embedded within the console of an aerial vehicle. All these variations, and others, are clearly contemplated within the scope of the present invention.

Display 120 is of the conventional type known in the art that responds to signals generated by processing unit 110 in order to display information to an operator—and specifically, in accord with the teachings hereof, to provide dynamic graphical representations of various system data, including flight paths, flight plans, etc. (as shown in FIGS. 2-4C and discussed below). Illustrated display 120 also responds to signals generated by processing unit 110 in accord with the teachings hereof to provide, for example, real-time guidance based on radar vectoring and/or course recalculation following the conclusion of such revectoring (as shown, for example, in FIGS. 3A-3C and discussed below), as well as to provide emergency landing guidance (as shown, for example, in FIGS. 4A-4C and discussed below).

Figure 2:
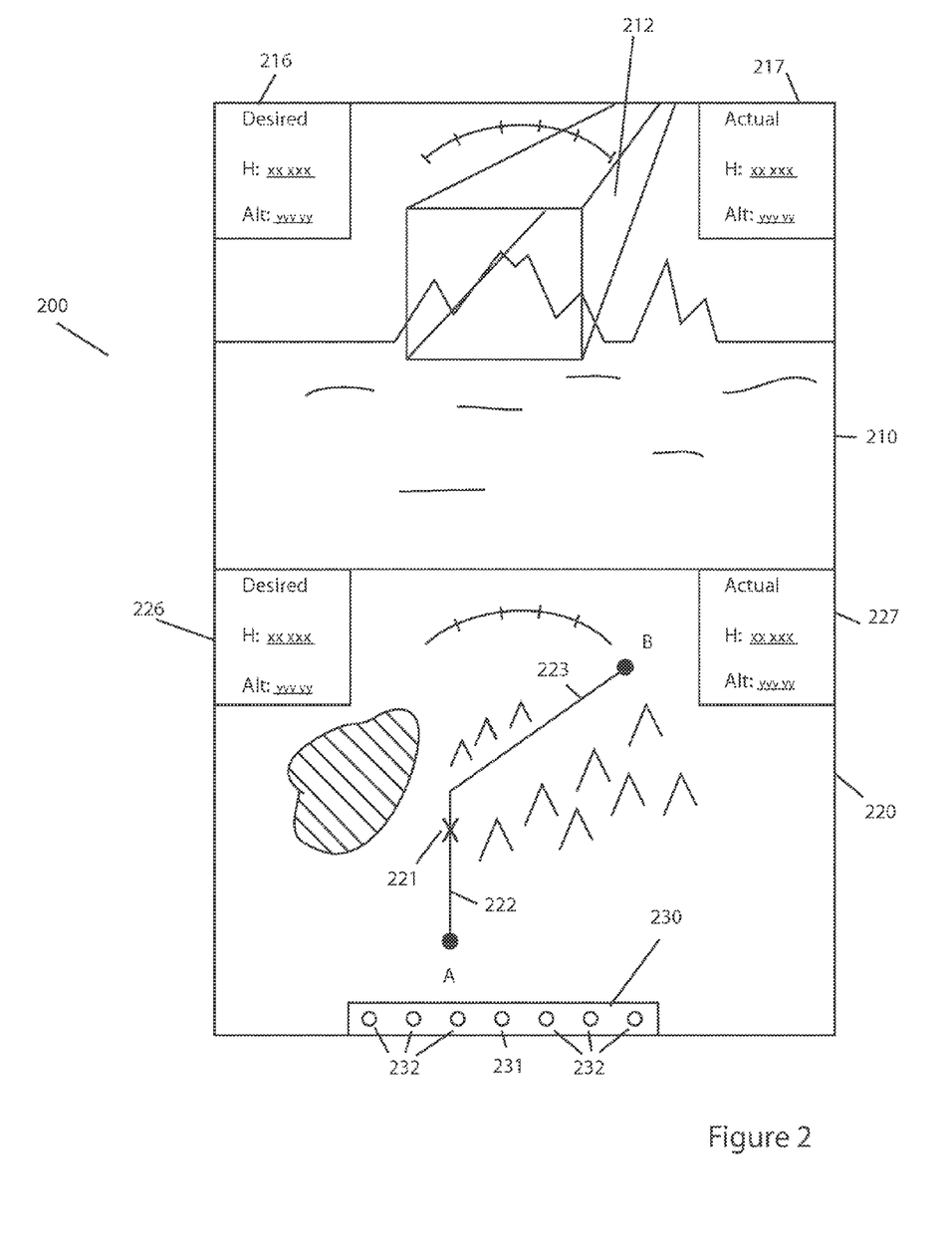
FIG. 2 depicts an electronic display showing an exemplary graphical representation of flight plan and actual flight data in two-dimensional and three-dimensional formats in systems according to the invention.

Such graphical representations as used in the illustrated embodiment can be arranged in a variety of configurations. Some exemplary embodiments are shown in the graphical representation 200 depicted in FIG. 2. There, a presentation 200 is split into two separate representations: a two-dimensional planar map 220 and a three-dimensional dynamic view 210. Existing aviation navigation systems can provide general two-dimensional or three-dimensional representations as depicted in FIG. 2; however, they cannot accommodate the various radar vectoring, emergency landing guidance and other features of the embodiments of the invention described herein. Of course, a dynamic graphical representation within the scope of the present invention can utilize a display that only shows one of the 2D or 3D representations, or only allows one to be shown at a time with some type of toggling allowed between the two representations. Other representations, such as a synthetic vision system, can also be employed.

The two-dimensional representation 220 of FIG. 2 includes a planar map with a flight plan path depicted by the line segments 222, 223 connecting the trip's origin A with the trip's final predetermined destination B. The marking "X" 221 shows the current location of the aerial vehicle with respect to the flight plan path 222, 223, the marking 221 moving relative to the map 220 in correspondence with the changes in the actual location of the aerial vehicle. The real-time flight plan path is represented textually by the data provided in window 226 presenting a desired vector described by heading and altitude values. The term "heading," as utilized in the present application, can be provided on an absolute basis, a relative basis, or a magnetic basis in accord with the use of such directions by ATC. Accordingly, an aviation navigational system according to the invention can be configured to utilize heading readings on any of these three bases, and others as typically practiced, and/or can be configured to inter-convert between two or more heading bases to increase the flexibility of the system to potential users. This window 226 can also present the desired radar vector during an off-course operation, as described below in further detail.

Those skilled in the art will appreciate that other types of two-dimensional mappings can also be used to provide graphical representations of flight plans and actual flight operations. For example, in contrast to the mapping 220 of FIG. 2 that shows the entire planned flight path between origin A and destination B, a two-dimensional mapping can be a moving map representation in which the two-dimensional image shows a larger scale map that moves as the flight proceeds to provide a real-time local view relative to the current vehicle location.

As well, the current direction of the aerial vehicle can be textually represented by the data in window 227, showing the actual heading and altitude of the vehicle. The difference between the actual direction and location of the aerial vehicle and the desired flight path, i.e., the course deviation information, can be used to provide an indication to the user of how to rectify flight operation to bring the aerial vehicle into line with the desired flight plan, or that the current flight operation is consistent with the desired flight plan.

The image 230 serves as an exemplary course deviation indicator ("CDI") to indicate the difference between a desired flight path and the actual flight path, and thus how to correct the current path to approach the desired flight path. For the CDI 230 in FIG. 2, the darkened center circle 231 indicates correspondence between the desired and actual flight paths. The remaining circles 232, when activated, provide an indication of how far the pilot needs to turn in the indicated direction to bring the actual flight path into alignment with the desired flight path.

The dynamic three-dimensional view 210 presents similar data to that displayed in the two-dimensional representation 220. The view 210 depicts a landscape, three-dimensional depiction, which can have varying amounts of geographic detail (e.g., showing mountains or water bodies) depending upon the data base utilized to create the depiction. As the location of the aerial vehicle changes with time, the view 210 is altered to depict the locality of the current position of the vehicle. Like the two dimensional depiction, windows 216, 217 can contain textual vectoring data (e.g., heading and altitude data) related to a desired flight path and actual flight operation, respectively. The desired flight path in the three-dimensional view 210 can be represented by a HITS symbology, such as the tunnel 212 depicted in the view 210. The vehicle operator attempts to maintain the aerial vehicle within the tunnel 212 to keep the vehicle on the desired flight path. Other representations of the desired flight path can include using a series of shapes (e.g., boxes, circles, or other shapes) that provide guidance for the vehicle operator as to where to steer the aerial vehicle, or that provide some other graphical indicator on the three-dimensional view to indicate where the desired flight path lies. Deviations between the actual and desired flight paths can again be corrected using a CDI as described above.

Figure 3A:
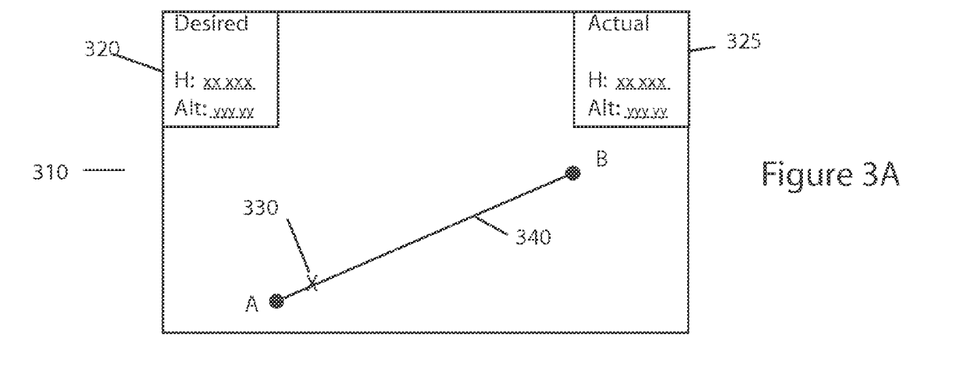
FIG. 3A depicts a two-dimensional graphical representation of a flight path between an origin A and destination B, along with the present location of an aerial vehicle, in systems according to the invention.
Figure 3B:
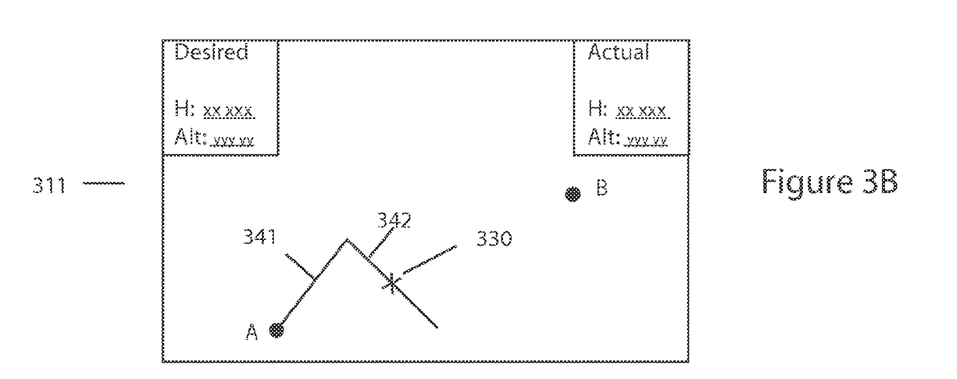
FIG. 3B depicts a two-dimensional graphical representation, wherein the flight path of FIG. 3A has been altered to accommodate a radar vector for an off-course operation.
Figure 3C:
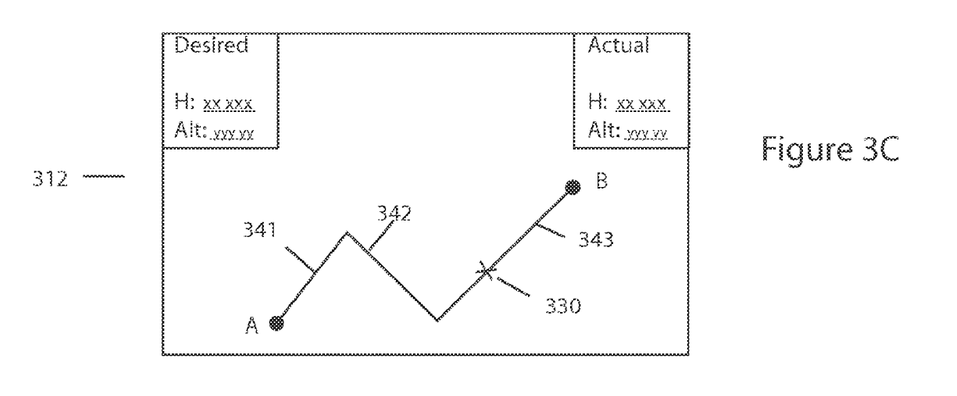
FIG. 3C depicts a two-dimensional graphical representation, wherein the off-course operations shown in FIG. 3B have been ceased, and a recalculated flight path to the final destination B has been displayed.

Operation of the system 100, as described above, may be further understood by reference to the time-sequenced two-dimensional views depicted in FIGS. 3A-3C. It will be appreciated that two-dimensional views are shown here for convenience and that, in practice, display 120 may be driven by processor 110 to present three-dimensional views instead or in addition.

As depicted in FIG. 3A, a desired flight plan path 340 is plotted between an origin A and a chosen destination B. A flight plan on which the path 340 is based can be chosen by entering a desired destination and origin into the processing unit 110 using the input unit 180. The desired flight path 340 can be calculated by the system 100 of FIG. 1 using data representing the geographic locations of A and B, which can be stored on static storage 114, and accounting for weather conditions that can be provided by real-time data sensors or sources 134. Such calculation can be performed in the conventional manner known in the art. The actual flight location 330 of the aerial vehicle can also be plotted on the two-dimensional map 310. This location can be updated real-time as the vehicle progresses through the air. The data for the actual flight location can be provided by a position sensor 131. The desired heading (e.g., magnetic heading) and altitude can be displayed in text box 320, with the actual vehicle heading and altitude displayed in text box 325. Sensors, such as the altitude sensor 133 and the heading sensor systems 132 (e.g., a compass), can be employed to provide the actual heading and altitude data, while the desired heading and altitude data can be generated by comparing the actual vehicle position with a desired position along the flight path, and calculating a path to bring the vehicle onto the desired flight path and/or to maintain the vehicle on the desired flight path. Such calculations can be performed using the processing unit 110.

At a later moment, an off-course operation can be initiated by the pilot in response to an ATC request to alter a desired flight plan due to inclement weather, air traffic, or other disruptions. Upon being requested to alter course to a particular radar vector heading and altitude, such radar vectors can be explicitly entered into an aerial navigation system by using an input unit 180, as shown in FIG. 1. Where input 180 is so equipped, radar vector operations may be initiated and/or heading and altitude information may be entered via voice, e.g., based on commands spoken by the pilot, copilot, or other, by way of non-limiting example. The system 100 adjusts the two-dimensional flight plan map 311 by showing that original flight plan path 341 is altered to a new heading and altitude 342 as depicted in FIG. 3B. Marking 330 shows the aerial vehicle following the desired radar vector off-course route. The desired and actual heading and altitude text boxes can be correspondingly adjusted, the former in accord with the radar vector information entered via input unit 180 and the latter in accord with data gathered appropriately from the system sensors 130. Of course during off-course operations, several different radar vectors can be entered (e.g., via unit 180) relating to particular adjustments in flight as commanded by ATC or the pilot. In this regard, the illustrated embodiment can allow an aviation navigation system to provide real-time active guidance for off-course operations and can maintain historical flight data associated with earlier flight operations.

Upon completion of off-course operations, an aerial navigational and/or flight management system according to the invention can be configured to cease display of radar vectors 342, and can calculate a new course to the desired destination 343 as depicted in FIG. 3C. Correspondingly, the desired heading and altitude data values can be adjusted to reflect the new flight plan, and provide real-time guidance to the aircraft operator. Such a change in the display can be activated in the system 100 of FIG. 1 by pressing a radar revector button 185 on the input unit 180 to cause the processing unit 110 to calculate a new flight path 343 based upon the position of the aerial vehicle at the time revectoring is initiated, the final destination location, weather data, and other factors as understood by those skilled in the art. The system 100 can also track the current location of the aerial vehicle 330 with respect to the newly calculated path 343. As previously discussed, desired and actual heading and altitude can also be displayed textually. The system can also maintain historical flight data 341, 342 such that information is not lost by the system 100 upon recalculating a flight plan to the desired destination B. All calculations and tracking can be performed in the conventional manner known in the art, albeit adapted to include the teachings of the present application. In addition, it is understood that radar vectoring can be reinitiated anywhere along path 343 if required—upon completion of the additional off-course operations, yet another new plot to the final destination can be calculated by again deactivating the radar vectoring mode. Radar vectoring can be reinitiated as many times as is necessary. Finally, if radar vectors are employed in the local vicinity to the final destination (e.g., merging traffic into an IFR or VFR approach), an aviation navigational system can be configured to provide automatic guidance for landing approach upon cancellation of the vectoring function or feature.

Whether during flight to the originally designated destination or during an off-course operation or otherwise, the system 100 can be placed in a mode for providing guidance for an emergency landing. This can be in response a complete loss of engine power (e.g., due to loss of fuel, fire, etc) or in response to an emergency short of such loss, but still requiring immediate routing to the nearest reachable airport, assumedly under no power.

In the illustrated embodiment, this emergency landing guidance mode is activated in the system 100 by the pilot (or some other operator) pressing an emergency landing button 186, by voice command, or other activation operation on the input unit 180—though, in other embodiments, that mode can be activated automatically, in response to detection of a loss of power or some other factor.

Upon activation of emergency landing guidance mode, the processing unit 110 determines flight paths from the aerial vehicle's current location to candidate airports within a possible glide range of the vehicle. To this end, the processing unit 110 determines a maximum possible glide range using conventional techniques known in the art. This can include taking a default value that is based on the aerial vehicle type and altitude, or it can involve more complex calculations that take into account possible tail winds, prevailing terrain elevations and so forth. If the pilot indicates (e.g., via input device 180) that the vehicle has sufficient power to extend the glide range, that can be taken into account, as well.

Regardless, the processing unit 110 then calculates flight paths to each of those candidate airports, particularly, paths that would place the aerial vehicle at a designated altitude (e.g., 1000 feet) above each airport and positioned for powerless descent thereto. Such flight paths can be determined by the unit 110 in the conventional manner known in the art. Of course, it will be appreciated that, since the processing unit has access to geographic mapping information (e.g., via static storage device 114), it calculates those flight paths to accommodate mountains (or other geographic and/or manmade features), airport-specific runway approaches, and so forth.

The processing unit 110 winnows out any candidate airports for which the calculated flight paths would exceed an estimate of the actual glide range of the vehicle (e.g., due to non-linearities in flight paths necessitated by geography, manmade features, airport-specific runway approaches, and so forth). Preferably, that estimate is based on vehicle type, altitude, head/tail winds, airport elevations, and so forth. If the pilot indicates (e.g., via input device 180) that the vehicle has sufficient power to extend the glide range, that can be taken into account, as well.

If following this winnowing step no airports are within range, the processing unit signals the pilot accordingly. (In which case, the pilot or other operator can specify coordinates of a farm, highway or other suitable secondary landing site, and have the processing unit calculate and display a pathway in accord with the same process described above vis-a-vis airports).

If following the winnowing step there are multiple candidate airports (or other landing sites, if so requested by the operator) within the actual glide range estimate, the processing unit 110 drives display 120 to present the calculated path to the nearest one. As noted previously, those paths take into account geographic and manmade features, runway-specific runway approaches, and so forth—even if those paths are non-linear—thereby insuring that the pilot can appropriately position the disabled craft for landing. Instead or in addition, it can permit the pilot to choose between the alternate candidate airports (or other landing sites) that are within the glide range, e.g., using the input device 180.

Figure 4A:
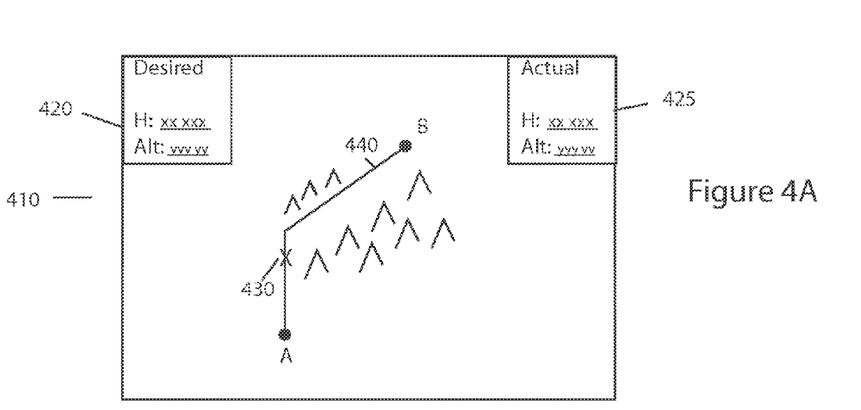
FIG. 4A depicts a two-dimensional graphical representation of a flight path between an origin A and destination B, along with the present location of an aerial vehicle, in systems according to the invention.
Figure 4B:
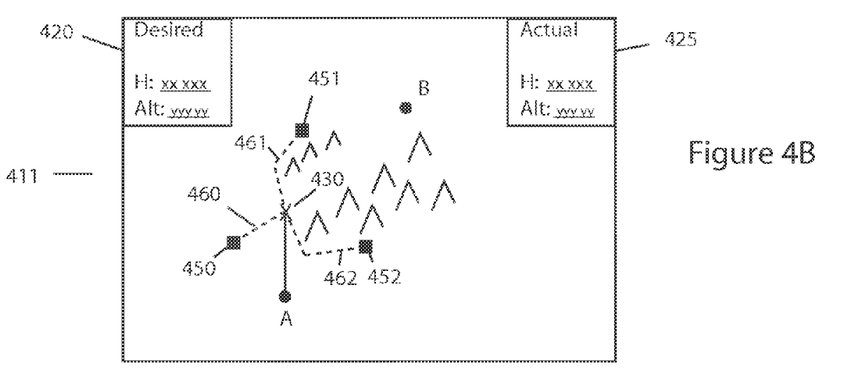
FIG. 4B depicts flight paths calculated upon activation of emergency landing guidance mode in systems according to the invention.
Figure 4C:
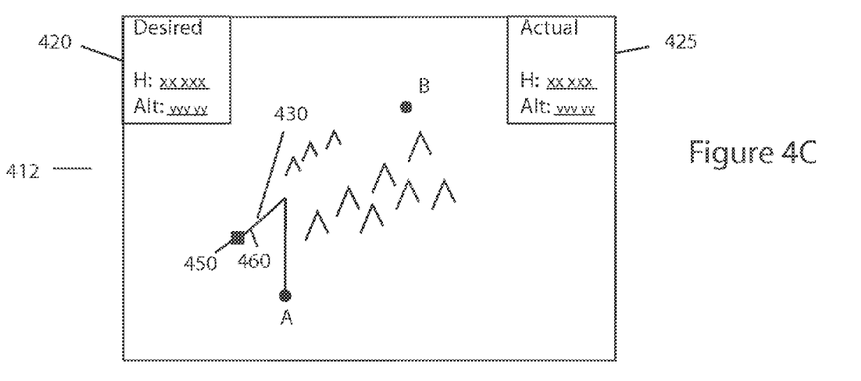
FIG. 4C depicts a flight path presented for emergency landing after a winnowing process in a system according to the invention.

Operation of the system 100, as described above in regard to providing guidance for an emergency landing, may be further understood by reference to the time-sequenced two-dimensional views depicted in FIGS. 4A-4C. It will be appreciated that two-dimensional views are shown here for convenience and that, in practice, system 100 may present three-dimensional views instead or in addition.

FIG. 4A depicts a flight plan path 440 (generated by processing unit 100 for presentation on display 120) between an origin A and destination B prior to activation of emergency guidance mode. Such a flight plan path 440 can be calculated and displayed as discussed above in connection with flight plan path 340 of FIG. 3A. The actual flight location 430 of the aerial vehicle can also be plotted and updated in real-time in the manner described above in connection with location 330 of FIG. 3A.

FIG. 4B depicts flight paths 460-462 calculated by the processing unit, upon activation of emergency landing guidance mode. These are candidate flight paths calculated by the processing unit 110 from the aerial vehicle's current location 430 to respective candidate airports 450-452 (or other landing sites, if so requested by the operator) within a possible glide range of the vehicle. As indicated by dashed lines, in the illustrated embodiment these candidate paths 460-462 are not rendered on display 411, though (in other embodiments) they may be so rendered.

FIG. 4C depicts the flight path identified by the processing unit after (a) winnowing out those to candidate airports (or other landing sites) for which the calculated flight paths would exceed an estimate of the actual glide range of the vehicle (e.g., due to non-linearities in flight paths necessitated by geography, manmade features, airport-specific runway approaches, and so forth), and (b) determining the closest of the remaining candidates. As indicated by solid lines, the processing unit 110 drives display 120 to present glide flight path 460 to airport 450; it does not display paths 461, 462 to "winnowed-out" or further airports (or landing sites) 451, 452. As noted above, in alternate embodiments, the processing unit 110 can effect display flight paths to alternate candidate airports (or other sites) that are within the glide range, e.g., yet not as close as selected airport 450.

Described above are systems and their methods of operation meeting the objects set forth earlier. Those skilled in the art will appreciate that the embodiments presented herein are merely examples and that other embodiments, incorporating changes thereto, fall within the scope of the invention. Thus, by way of non-limiting example, it will be appreciated that the specific arrangement of the presentations of FIGS. 1-4C is merely by way of example and shall not be construed to limit the invention. Those skilled in the art will also appreciate that systems according to the invention can additionally be programmed for emergency landing and/or vectored guidance automatically to account for weather, air traffic or other events that can alter typical flight operations. Such guidance can be triggered by a number of mechanisms such as transmission of signaling from ATC, automatic dependent surveillance-broadcast, or mechanisms providing communication regarding flight operations. Such automatic vector guidance can also be triggered, by way of further non-limiting example, via speech recognition (e.g., of a pilot's, copilot's, or other's voice). Moreover, systems according to the invention can be adapted to control flight autopilot, e.g., to automatically effect instructed vectoring operation.

In view of the foregoing, what I claim is:

1. An aviation navigational apparatus configured for use with an aerial vehicle, comprising:
   a display; and
   a processing unit in communications coupled with the display;
   the processing unit being configured to generate signals for effecting presentation on the display including an emergency pathway from the vehicle during flight to at least one candidate landing site that is in glide range of the vehicle,
   where the processing unit takes geographical and manmade features into account in determining each such candidate landing site and respective emergency pathway thereto.

2. The aviation navigational apparatus of claim 1, wherein the processing unit takes into account characteristics of the aerial vehicle in determining each such candidate landing site and respective emergency pathway.

3. The aviation navigational apparatus of claim 2, wherein the processing unit takes a glide range of the aerial vehicle in determining each such candidate landing site and respective emergency pathway.

4. The aviation navigational apparatus of claim 1, wherein the processing unit takes into account characteristics of weather in determining each such candidate landing site and respective emergency pathway.

5. The aviation navigational apparatus of claim 1, wherein the processing unit takes into account characteristics of airport-specific runway approaches in determining each such candidate landing site and respective emergency pathway.

6. The aviation navigational apparatus of claim 1, wherein the processing unit takes into account characteristics of mountains and/or other geographical features in determining each such candidate landing site and respective emergency pathway.

7. The aviation navigational apparatus of claim 1, wherein the processing unit disregards, in determining each such candidate landing site and respective emergency pathway, airports that cannot be reached by the aerial vehicle under powerless flight.

8. The aviation navigational apparatus of claim 1, wherein the processing unit disregards, in determining each such candidate landing site and respective emergency pathway, airports that cannot be reached due to at least one of geographical features and manmade features.

9. The aviation navigational apparatus of claim 1, wherein the processing unit disregards, in determining each such candidate landing site and respective emergency pathway, airports that cannot be reached due to airport-specific runway approaches.

10. An aviation navigational apparatus configured for use with an aerial vehicle, comprising:
   a display; and
   a processing unit in communications coupled with the display;
   the processing unit configured to generate signals for effecting presentation on the display indicating an emergency pathway to at least one candidate land site that is in glide range of the vehicle,
   where the processing unit takes geographical and manmade features into account in determining each such candidate landing site and a respective emergency pathway thereto, regardless of whether that pathway is non-linear.

11. The aviation navigational apparatus of claim 9, further comprising an input device to activate the processing unit (i) to determine such candidate landing site and respective emergency pathway and (ii) generate signals for effecting presentation thereof on the display.

12. A method of aviation navigation for use with an aerial vehicle, comprising:

A. placing a guidance system in a mode to provide guidance for an emergency landing, where the guidance system comprises (i) a display and (ii) a processing unit, in communications coupling with the display, configured to generate signals for effecting presentation on the display of a pathway to a destination,
   B. with the processing unit, determining a flight path from the aerial vehicle's current location to one or more candidate landing sites that are within a glide range of the vehicle,
   C. the flight path-determining step including calculating such flight path to accommodate geographical and/or manmade features, regardless of whether such path is non-linear,
   D. displaying with the guidance system one or more flight paths so determined.

13. The method of claim 12, where the flight path-determining step includes taking one or more of aerial vehicle type, altitude, tail winds, prevailing terrain elevations, and pilot input into account in determining an actual glide range estimate of the aerial vehicle.

14. The method of claim 12, comprising winnowing multiple candidate landing sites within an actual glide range estimate of the vehicle in order to determine which to display with the guidance system.

15. The method of claim 12, where the flight path-determining step includes taking into account characteristics of the aerial vehicle in determining each such candidate landing site and respective flight path.

16. The method of claim 12, where the flight path-determining step includes taking into account characteristics of weather in determining each such candidate landing site and respective flight path.

17. The method of claim 12, where the flight path-determining step includes taking into account characteristics of airport-specific runway approaches in determining each such candidate landing site and respective flight path.

18. The method of claim 12, where the flight path-determining step includes taking into account characteristics of mountains and/or other geographical features in determining each such candidate landing site and respective flight path.

19. The method of claim 12, where the flight path-determining step includes taking into account airports that cannot be reached by the aerial vehicle under powerless flight in determining each such candidate landing site and respective flight path.

20. The aviation navigational apparatus of claim 1, wherein the candidate landing site is an airport.

* * * * *